US008559959B2

(12) United States Patent
Du

(10) Patent No.: US 8,559,959 B2
(45) Date of Patent: *Oct. 15, 2013

(54) HANDOFF ACCESS METHOD AND DEVICE BASED ON RANDOM ACCESS CHANNEL

(75) Inventor: Zhongda Du, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,569

(22) Filed: Jun. 7, 2012

(65) Prior Publication Data
US 2012/0243507 A1 Sep. 27, 2012

Related U.S. Application Data

(63) Continuation-in-part of application No. 12/443,149, filed as application No. PCT/CN2007/002779 on Sep. 20, 2007, now Pat. No. 8,229,439.

(30) Foreign Application Priority Data

Sep. 29, 2006 (CN) .......................... 2006 1 0152450

(51) Int. Cl.
*H04W 36/00* (2009.01)
*H04W 4/00* (2009.01)
(52) U.S. Cl.
USPC .......................... 455/438; 455/439; 370/331
(58) Field of Classification Search
USPC .......................... 455/436, 438, 439; 370/331
See application file for complete search history.

(56) References Cited

U.S. PATENT DOCUMENTS

| 6,097,717 | A | 8/2000 | Turina et al. |
| 2004/0071248 | A1 | 4/2004 | Nakamura et al. |
| 2004/0176094 | A1 | 9/2004 | Kim et al. |
| 2005/0030924 | A1 | 2/2005 | Yano et al. |
| 2005/0105490 | A1 | 5/2005 | Lee et al. |
| 2007/0165567 | A1 | 7/2007 | Tan et al. |

OTHER PUBLICATIONS

International Search Report dated Jan. 3, 2008 issued in PCT/CN2007/002779.
Xuemai, Gu et al., "A Performance Anaysis of Reservation Access Algorithm for Radio Data Networks", Journal of Harbin Institute of Technology, Apr. 1997, vol. 29, No. 2, ISSN. 0367-6234, 5 pgs.
Fei-Yan, Sun et al., "On throughput performance of the CDMA reservation-ALOHA multiple Access system for the HFC network", ACTA Electronics Sinica, Nov. 2001, vol. 29, No. 11, ISSN 0372-2112, 6 pgs.

*Primary Examiner* — Christopher M Brandt
(74) *Attorney, Agent, or Firm* — Scully, Scott, Murphy & Presser, P.C.

(57) ABSTRACT

A handoff access method and device based on a random access channel is provided, the method comprising: a source BS sends a handoff request message to a target BS; the target BS sends a handoff response message to the source BS, and then the source BS forwards a handoff command with the content of the handoff response message to the mobile terminal, wherein a sequence number of a reserved character code allocated by the target BS to the mobile terminal and a random access sub-channel that the reserved character code is located in are contained in the handoff command message; after receiving the handoff command message, the mobile terminal selects the reserved character code and the random access sub-channel that the reserved character code is located in; and a handoff access procedure is initialized on the random access sub-channel by the target BS and the mobile terminal.

16 Claims, 8 Drawing Sheets

HANDOFF ACCESS METHOD AND DEVICE BASED ON RANDOM ACCESS CHANNEL

CROSS-REFERENCE TO RELATED APPLICATIONS

This application is a continuation-in-part application of U.S. patent application Ser. No. 12/443,149, filed on Nov. 2, 2009, which is the national phase under §371 of International Application No. PCT/CN2007/002779, filed on Sep. 20, 2007, which claims priority to Chinese Patent Application No. 200610152450.8, filed on Sep. 29, 2006, the entire contents of each of which are incorporated herein by reference.

FIELD OF THE INVENTION

The present invention relates to communication field, in particular to a handoff access method and device based on random access channel.

BACKGROUND OF THE INVENTION

As shown in FIG. 1, a cellular wireless communication system is mainly composed of a mobile terminal, a wireless access network, and a core network.

For the cellular wireless communication system, the mobile terminal needs to send a random access message via uplink common channel before communicating with the network. Such a common channel is referred to as random access channel. The main purpose of random access is to occupy limited wireless channel resources in a competitive manner, and/or to obtain uplink synchronous information. The uplink synchronous information is utilized by the mobile terminal to determine when to send uplink signal, so that the uplink signal falls into the signal reception time window of a base station (BS) receiver.

The channels of the cellular wireless communication system can be distinguished by all possible technologies, such as code division, frequency division, and time division, and the minimum unit in time domain of each channel is a frame. The frame or frame combination for random access is a random access time slot, and the random access time slots of the same channel compose a random access sub-channel in a certain way. In FIG. 2, 3 frequency carriers (FCs) and 3 channel codes (CCs) compose 9 channels, for example, the FC 2 and the CC 2 compose a channel, and one of every 6 frames on this channel is utilized as a random access time slot which form a random access sub-channel on this channel, and the spacing between two random access time slots are 5 frames. The channel composed of FC 1 and CC 1 is also configured with a random access sub-channel, and thus there are 2 random access sub-channels in this cell.

The message per se employs a very low data rate in order to ensure an effective coverage of an initial random access message, in other words, the message has limited information bits. For instance, in the LTE (Long Term Evolution) system of currently discussed 3GPP (3rd Generation Partnership Project), a random time slot composed of non-synchronous single frames (duration: 1 ms) can carry information not more than 10 bits.

Generally, the information bits of a random access message are represented by sequence number of character codes with high self-correlation. During one random access time slot, the wireless access network can distinguish random access messages containing various character codes, and thus a collision occurs only when two random access messages with an identical character code are received during a same random access time slot. The collision will result in that the wireless access network can not distinguish the individual terminals, that is to say, in the view of the wireless access network, the effect is the same as that only access request from one terminal is received. In this circumstance, an additional collision resolution mechanism between the terminals and the wireless access network is required to ensure that one of the terminals can access successfully, while the failed ones will access to the wireless network in such competitive manner again. Sometimes, a collision can result in failure in the access of all terminals involved in the collision.

The initial access starting from an idle mode is one reason for random access, and one more important reason is the handoff access between BSs.

During the communication between a terminal and a network, when the terminal moves among different cells, the wireless channel needs to be switched to keep the communication. When a target cell and a source cell belong to different BSs, one possible handoff manner is that a target BS has provided wireless channel resources during the handoff preparation stage, and then informs the terminal to access to the wireless channel allocated by the target BS via a source BS. This handoff manner is very effective for systems based on dedicated wireless channel resource, such as GSM (Global System for Mobile Communication), but it will increase the system complexity and thus result in a low utilization ratio of the wireless channel resource for wireless communication systems based on shared channel, such as LTE, this is because the resource BS needs to know the time difference between the source BS and the target BS at the beginning of the handoff so as to inform the terminal of a proper time to access to the target BS. However, it is very difficult to obtain a precise time difference, and therefore the wireless access network needs to employ a complex mechanism to acquire the time difference. Besides, because the transmission time of a message in the wireless access network or wireless interface is uncertain, it is very difficult for the target BS to reserve shared wireless channel resources, a too early reservation will lower the utilization efficiency of the wireless channel, and a too late reservation will result in missing access time of the terminal or introducing an additional delay, and therefore some redundant wireless channel resources will be reserved to ensure successful handoff, which will lower the utilization efficiency of the wireless resources. So generally, a handoff manner without reserving wireless channel resources will be employed, that is to say, the terminals acquire wireless channel resources at the target BS in a competitive random access manner. With the technological development of cellular wireless communication system, the time for such random access procedure is very short, for example, it takes about 20 ms in the LTE system.

When a terminal being in communication moves among cells, means such as handoff need to be employed to keep the communication continuity. Generally, channels except common channels employ channel share mechanism, and the uplink and downlink wireless resources are scheduled by wireless access network.

The delay for a terminal in accessing to wireless access network via random access is very important to either access reason. However, the delay of handoff access, i.e. the delay due to handoff interruption is subject to a stricter requirement by the cellular wireless communication system. When a terminal moves among cells, the most primary and direct reason for handoff is that the signal strength of the original cell has decreased to such a dangerous extent that the communication quality of the terminal will be deteriorated, even phenomena such as call drop and interruption will occur, if the wireless channel is not switched to a cell with better signal quality. For a terminal, there is obvious difference between the introduction in idle state or inactive state and the introduction in service active state for a same delay, and the terminal is more sensitive to the latter. During a random access procedure, the delay is mostly incurred from the above said "collision", because the collision will result in that only one terminal can access to the wireless network, or even all terminals fail in the access, and even if the failed ones can re-access successfully, that will result in more delay. It is necessary to provide a method to eliminate the collision probability during the handoff access procedure of a terminal based on the importance of handoff access.

Thus, there is a need for a handoff access solution for cellular wireless communication system to solve one of the above mentioned problems.

SUMMERY OF THE INVENTION

The present invention is directed to provide a handoff access method and device based on random access channel to solve the problem of not discriminating the importance of handoff access of the prior art.

According to one aspect of the present invention, a handoff access method based on a random access channel is provided, for handoff access of a mobile terminal in a cellular mobile communication system, and comprises the following steps: a) Step a, sending a handoff request message to a target BS by a source BS, the handoff request message is used to request switching a mobile terminal that the source BS serves to the target BS; b) sending a handoff response message to the source BS by the target BS, then forwarding a handoff command with the content of the handoff response message to the mobile terminal by the source BS, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance; c) after receiving the handoff command message by the mobile terminal, determining the handoff command message includes the sequence number of the reserved character code and then selecting the reserved character code and the random access sub-channel that the reserved character code is located in, by the mobile terminal; and d) initiating a handoff access procedure on the random access sub-channel by the target BS and the mobile terminal.

According to another aspect of the present invention, a handoff access device based on a random access channel for the handoff access of a mobile terminal in a cellular mobile communication system is provided, which comprises: a handoff request module, used to make a source BS send a handoff request message to a target BS to request switching a mobile terminal that the source BS serves to the target BS; a handoff response module, used to make the target BS send a handoff response message to the source BS, and the source BS transmit the content of the handoff response message contained in a handoff command to the mobile terminal, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance; a sub-channel selection module, used to make the mobile terminal determine that the handoff command message includes the sequence number of the reserved character code and then select the reserved character code and the random access sub-channel that the reserved character code is located in after the handoff command message is received; a handoff access module, used to make the target BS and the mobile terminal initiate a handoff access procedure on the random access sub-channel.

According to another aspect of the present invention, a mobile station is provided, which comprises: a receiving unit, configured to receive handoff command message from a source base station, wherein a sequence number of a reserved character code allocated by a target BS to the mobile terminal and a random access sub-channel that the reserved character code is located in are contained in the handoff command message, and the reserved character code is a part of random access character codes reserved for the handoff access mobile terminal in advance; a determining unit, configured to determine the sequence number of the reserved character code contained in the handoff command message; a selecting unit, configured to select the reserved character code and the random access sub-channel that the reserved character code is located in; and an accessing unit 1008, configured to initiate a handoff access procedure on the random access sub-channel with the target BS.

According to another aspect of the present invention, a base station is provided, which comprises: a receiving unit, configured to receive a handoff request message sent by a source BS, wherein the handoff request message is used to request switching a mobile terminal that the source BS serves to the BS; a sending unit, configured to send a handoff response message to the source BS, wherein a sequence number of a reserved character code allocated by the BS to the mobile terminal and a random access sub-channel that the reserved character code is located in are contained in the handoff response message, and the reserved character code is a part of random access character codes reserved for the handoff access mobile terminal in advance; and an accessing unit, configured to receive a handoff access of the mobile terminal on the random access sub-channel.

According to another aspect of the present invention, a base station is provided, which comprises: a first sending unit, configured to send a handoff request message to a target BS, wherein the handoff request message is used to request switching a mobile terminal that the BS serves to the target BS; a receiving unit, configured to receive a handoff response message sent by the target BS; and a second sending unit, configured to send a handoff command message to the mobile terminal, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance.

The present invention can realize the following technological effects through the above technical solution.

The method according to the present invention can prevent the terminal requesting handoff access at any time at a wireless interface from initiating a same handoff access message in a same time slot of a same random access sub-channel after being allocated with a character code, and thus possible collisions among handoff access messages can be eliminated, and also the uncertainty that arises when the handoff access message confirms the identity of the terminal at the wireless access network side can be avoided.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

The present invention will be detailed hereinafter in connection with the embodiments of the present invention and reference will be made to the drawings.

The present invention provides a handoff access method and device based on random access channel.

Figure 7:
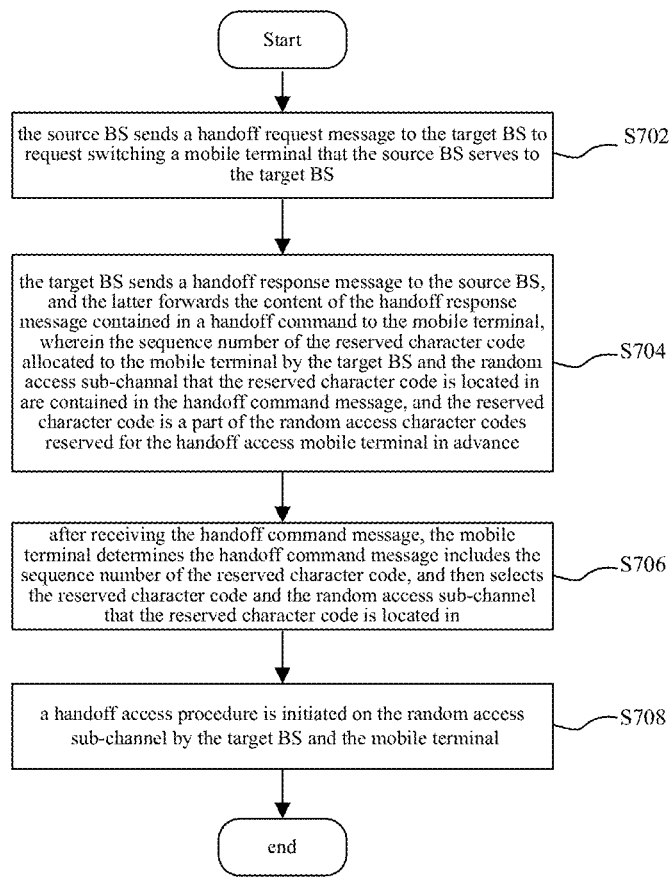
FIG. 7 is a flowchart of the handoff access method based on random access channel according to the present invention.

FIG. 7 is a flowchart of the handoff access method based on random access channel according to the present invention, and the procedure comprises the following steps:

Step 702, a source BS sends a handoff request message to a target BS, requests switching a mobile terminal that the source BS serves to the target BS;

Step 704, the target BS sends a handoff response message to the source BS, and the latter forwards the content of the handoff response message contained in a handoff command to the mobile terminal, wherein the handoff command message comprises the sequence number of the reserved character code allocated to the mobile terminal by the target BS and the random access sub-channel that the reserved character code is located in, and the reserved character code is a part of the random access character codes reserved for the handoff access mobile terminal in advance;

Step 706, after receiving the handoff command message, the mobile terminal determines the handoff command message includes the sequence number of the reserved character code, and then selects the reserved character code and the random access sub-channel that the reserved character code is located in; and Step 708, a handoff access procedure is initiated on the random access sub-channel by the target BS and the mobile terminal.

Preferably, the information of the reserved character code is in the system information, and is broadcasted in the cell.

Preferably, the system information is broadcasted on the broadcasting channel or on the shared channel.

Alternatively, Step 704 comprises the following step: the handoff command message contains a temporary ID number allocated to the mobile terminal by the source BS, and there is a one-to-one corresponding relationship between the temporary ID number, the reserved character code and the random access sub-channel that the reserved character code is located in.

Alternatively, Step 706 comprises the following step: the mobile terminal is specified to employ the reserved character code to send a random access message on the random access sub-channel.

Alternatively, Step 708 comprises the following step: the target BS determines that the mobile terminal initiates handoff access based on the reserved character code, and determines the temporary ID number based on the reserved character code and the random access sub-channel, then the target BS sends a handoff access response message to the mobile terminal corresponding to the temporary ID number separately.

Alternatively, the handoff access response message is transmitted on a downlink logical dedicated channel, or transmitted on a logical dedicated channel via hybrid automatic repeat request technology.

Alternatively, Step 708 also comprises the following step: the mobile terminal sends a handoff complete message after the handoff access response message is received.

Figure 8:
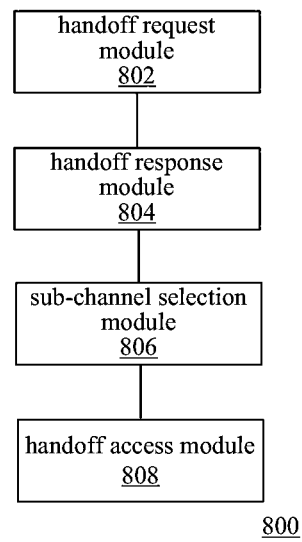
FIG. 8 is a block diagram of the handoff access device based on random access channel according to the present invention.

FIG. 8 is a block diagram of the handoff access device 800 based on random access channel according to the present invention. The handoff access device 800 comprises:

A handoff request module 802 which makes the source BS send the handoff request message to the target BS to request switching the mobile terminal that the source BS serves to the target BS;

A handoff response module 804 which makes the target BS send the handoff response message to the source BS, and the source BS forwards the content of the handoff response message contained in the handoff command to the mobile terminal, wherein the handoff command message comprises the sequence number of the reserved character code allocated to the mobile terminal by the target BS and the random access sub-channel that the reserved character code is located in, and the reserved character code is a part of the random access character codes reserved for the handoff access mobile terminal in advance;

A sub-channel selection module 806 which makes the mobile terminal determine that the handoff command message includes the sequence number of the reserved character code after the handoff command message is received and select the reserved character code and the random access sub-channel that the reserved character code is located in; and A handoff access module 808 which makes the target BS and the mobile terminal initiate the handoff access procedure on the random access sub-channel.

Alternatively, the handoff response module 804 is used to make the target BS add the temporary ID number allocated to the mobile terminal in the handoff command message, and there is a one-to-one corresponding relationship between the temporary ID number, the reserved character code and the random access sub-channel that the reserved character code is located in.

Alternatively, the sub-channel selection module 806 is used to make the mobile terminal specify that the reserved character code is employed to send the random access message on the random access sub-channel.

Alternatively, the handoff access module 808 is used to make the target BS determine that the mobile terminal initiates handoff access based on the reserved character code, and determine the temporary ID number based on the reserved character code and the random access sub-channel, and then send the handoff access response message to the mobile terminal corresponding to the temporary ID number separately.

Alternatively, the handoff access module 808 makes the handoff access response message be transmitted on the downlink logical dedicated channel, or be transmitted on the logical dedicated channel via the hybrid automatic repeat request technology.

Alternatively, the handoff access module 808 is also used to make the mobile terminal send a handoff complete message after the handoff access response message is received.

Figure 10:
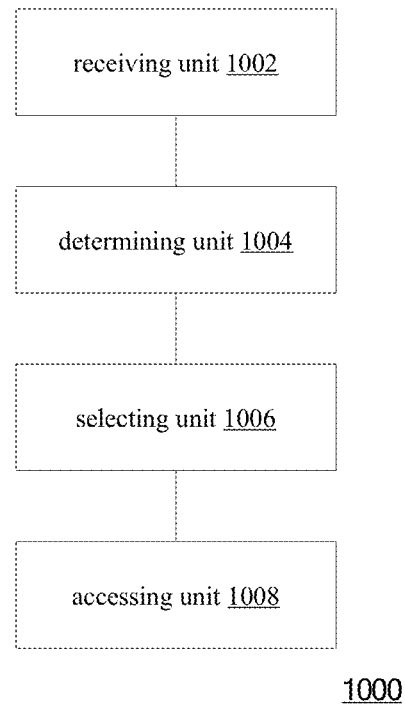
FIG. 10 is a block diagram of a mobile station according to the present invention.

FIG. 10 is a block diagram of a mobile station 1000 according to the present invention. The mobile station 1000 comprises:

a receiving unit 1002, configured to receive handoff command message from a source base station, wherein a sequence number of a reserved character code allocated by a target BS to the mobile terminal and a random access sub-channel that the reserved character code is located in are contained in the handoff command message, and the reserved character code is a part of random access character codes reserved for the handoff access mobile terminal in advance;

a determining unit 1004, configured to determine the sequence number of the reserved character code contained in the handoff command message;

a selecting unit 1006, configured to select the reserved character code and the random access sub-channel that the reserved character code is located in; and an accessing unit 1008, configured to initiate a handoff access procedure on the random access sub-channel with the target BS.

Preferably, the handoff command message comprises a temporary ID number allocated to the mobile terminal by the target BS, wherein there is a one-to-one corresponding relationship between the temporary ID number, the reserved character code and the random access sub-channel that the reserved character code is located in.

Figure 11:
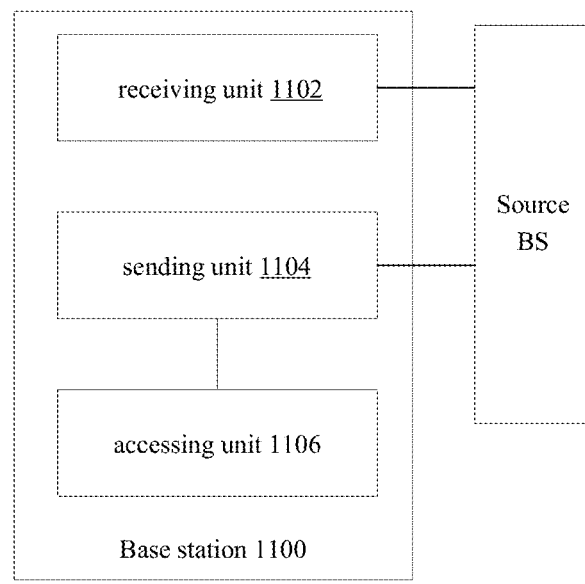
FIG. 11 is a block diagram of a base station according to the present invention.

FIG. 11 is a block diagram of a base station 1100 according to the present invention. The base station 1100 comprises:

a receiving unit 1102, configured to receive a handoff request message sent by a source BS, wherein the handoff request message is used to request switching a mobile terminal that the source BS serves to the BS;

a sending unit 1104, configured to send a handoff response message to the source BS, wherein a sequence number of a reserved character code allocated by the BS to the mobile terminal and a random access sub-channel that the reserved character code is located in are contained in the handoff response message, and the reserved character code is a part of random access character codes reserved for the handoff access mobile terminal in advance; and an accessing unit 1106, configured to receive a handoff access of the mobile terminal on the random access sub-channel.

Preferably, the handoff command message comprises a temporary ID number allocated to the mobile terminal by the BS, wherein there is a one-to-one corresponding relationship between the temporary ID number, the reserved character code and the random access sub-channel that the reserved character code is located in.

Figure 12:
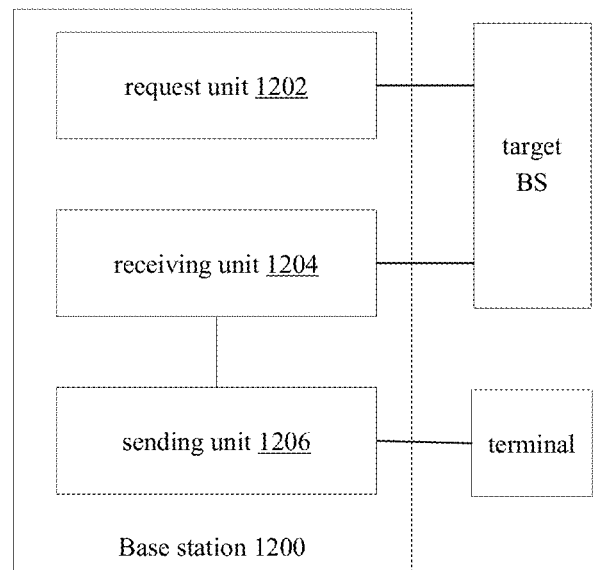
FIG. 12 is a block diagram of another base station according to the present invention.

FIG. 12 is a block diagram of a base station 1200 according to the present invention. The base station 1200 comprises:

a requesting unit 1202, configured to send a handoff request message to a target BS, wherein the handoff request message is used to request switching a mobile terminal that the BS serves to the target BS;

a receiving unit 1204, configured to receive a handoff response message sent by the target BS; and a sending unit 1206, configured to send a handoff command message to the mobile terminal, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance.

Preferably, the handoff command message comprises a temporary ID number allocated to the mobile terminal by the target BS, wherein there is a one-to-one corresponding relationship between the temporary ID number, the reserved character code and the random access sub-channel that the reserved character code is located in.

Now, the embodiments according to the present invention will be described in detail.

The wireless access network of cellular mobile communication system according to the present invention employs the following methods to discriminate handoff access and other random access:

1, the reserved character code is a part of the random access character codes reserved for the handoff access mobile terminal in advance; and 2, the character code per se contained in the random access message shows the access reason cryptically, that is to say, if the character code contained in a certain random access message is a reserved character code, then the reason for the access is handoff access.

If there is a plurality of random access sub-channels in a cell, then the character code can be reserved on the plurality of random access sub-channels. The random access sub-channel that the reserved character code is located in should be specified when the reserved character code is allocated to a certain accessed terminal, so as to prevent the terminals allocated with an identical reserved character code from being accessed on the same random access sub-channel, and otherwise collision will occur. The information of the character code reserved on one or more random access sub-channels is referred to as reserved information of the character code.

Figure 9:
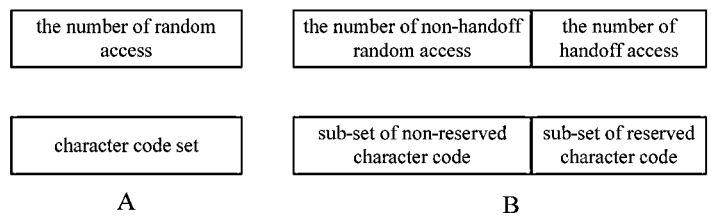
FIG. 9 is a schematic view of the character code reservation according to one embodiment of the present invention.

As shown in FIG. 9, Part A means that all of the random access reasons of one random access sub-channel of a cell share all of the character codes, and terminal collision probability meets a time slot ALOHA rule. Suppose the arrival of random access meets the Poisson Law, then the collision probability for a terminal initiating random access is expressed by the following equation in the view of that terminal:

$$P_s = 1 - e^{-G}$$

$P_s$ is the collision probability in case of random access of the terminal.

G is the average number of the random access requests that may be received at each random access opportunity.

One random access opportunity is the opportunity that using one character code to trigger one random access procedure during one random access time slot, and the number of the random access opportunities in a cell in 1 s can be expressed by the following equation:

$$N_{ro}=N_f*10000/T*N_s$$

wherein, $Ni_{ro}$ is the number of the random access opportunities;

$N_f$ is the number of the random access sub-channels of a cell;

T is the time interval between random access time slots, and the unit of T is ms; and $N_s$ is the total number of the character codes in one random access time slot.

As shown in FIG. 9, Part B means that a part of the character codes is reserved as reserved character code. From FIG. 9 we can also find that the same proportion of random accesses, in fact the handoff access, is also distinguished. These handoff accesses will share all of the reserved character code, while other random accesses will share the remaining non-reserved character code. Due to the number $N_f$ of the random access and the number $N_s$ of the character code of the same proportion is separated, the number G of the potentially received random access at each remaining random access opportunity remains the same as it is before separation, and thus the collision probability of the remaining random access keeps unchanged according to the time slot ALOHA theory.

For handoff access, because the reserved character code is allocated by wireless access network, it can be ensured that there is no collision among the handoff access terminals by a certain management.

Figure 1:
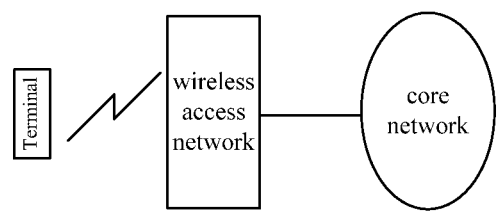
FIG. 1 is a structure view of a cellular wireless communication system.
Figure 2:
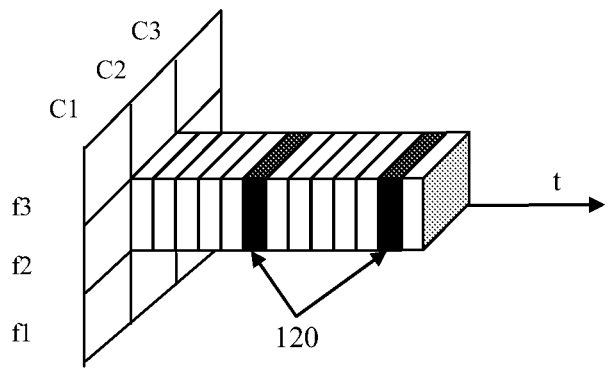
FIG. 2 is a schematic view of a random access sub-channel and a time slot.
Figure 3:
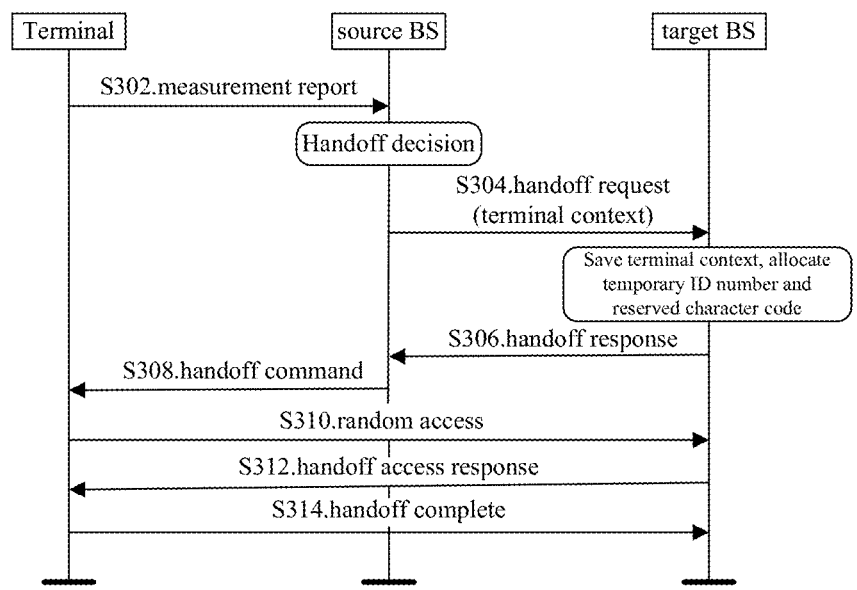
FIG. 3 is a flowchart of the handoff procedure of a cellular wireless communication system using reserved character code according to one embodiment of the present invention.

FIG. 3 is a handoff flowchart showing that the cellular mobile communication system allocates reserved character code for handoff access, and the handoff process comprises:

Step 302, a terminal sends a measurement report to the source BS in service, which comprises the measurement information about adjacent cells. After analyzing the measurement report sent by the terminal, the source BS determines whether to switch the terminal out of its coverage area in connection with the wireless resource management information configured, and then selects one target BS for handoff if it is determined to do switch;

Step 304, the source BS sends a handoff request message to the target BS, and the request message contains the terminal context saved at the source BS;

Step 306, after saving the context, the target BS allocates a temporary ID number and a reserved character code to the terminal. The sequence number of the allocated reserved character code and the information about the random access sub-channel that the character code is located in will be contained in a handoff response message sent to the source BS and there is a one-to-one corresponding relationship between the information and the temporary ID number allocated to the terminal;

Step 308, the source BS sends a handoff command message to the terminal at the wireless interface, and the sequence number of the allocated reserved character code, the information about the random access sub-channel that the character code is located in, and the temporary ID number of the terminal are contained in the handoff command message.

Step 310, after receiving the handoff command message, the terminal sends a random access message on the random access sub-channel specified in the message, and the random access message utilizes a specified reserved character code;

Step 312, after receiving the random access message, the target BS confirms it is a handoff access without collision in case that the character code utilized in the message is found to be a reserved character code. Then the target BS determines the ID of the terminal based on the sequence number of that character code and the information about the random access sub-channel receiving the random access message. And then the target BS feeds back information such as uplink synchronous information and uplink wireless channel resource information to the terminal via the handoff access response message; and Step 314, after receiving the handoff access response message, the terminal sends a handoff complete message.

Figure 4:
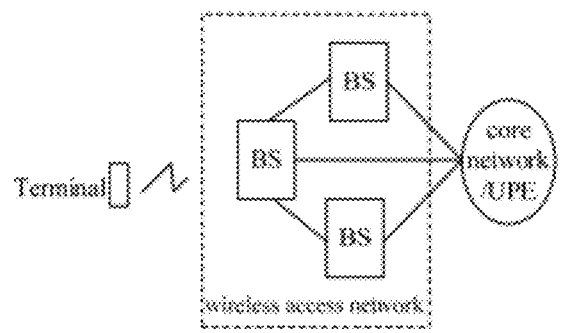
FIG. 4 is a schematic view of the structure of a LTE system.

The LTE system currently discussed in the field is a typical cellular wireless communication system. As shown in FIG. 4, the system consists of terminals, BSs and a core network, that whether there is logical or even physical connection between BSs depends on mobility management requirement of the network. All of the BSs connect with the core network, and all the BSs connecting with the core network constitute a wireless access network, the uplink/downlink wireless resource management thereof is based on the idea of channel share, and scheduled by the BSs.

Figure 5:
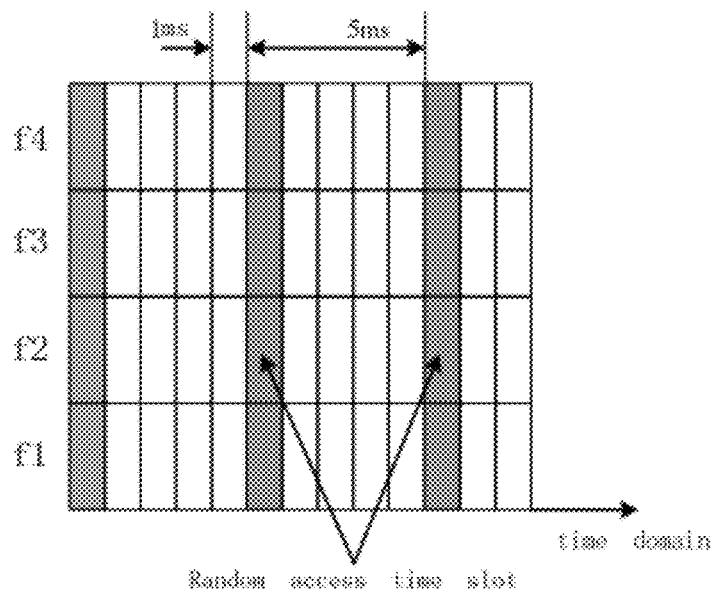
FIG. 5 is a schematic view of a random access sub-channel and a time slot of the LTE system.

In the LTE system, channels are configured in frequency domain, and as shown in FIG. 5, 4 frequency bands forms 4 channels. The frame for random access on a channel is referred to as random access time slot, and on a channel, the random access time slots with fixed intervals form random access sub-channel. During initial access, uplink synchronization, uplink resource request or handoff among BSs, the terminal sends random access message on the uplink random access sub-channel, and the information bit loaded in the message is expressed by the sequence number of a character code with high self-correlation.

The First Embodiment

In a LTE system, there are 2 random access sub-channels with a time slot interval of 10 ms in a cell, and there are 64 character codes in one time slot (i.e. representing 6 information bits), and then there are 2×100×64, i.e. 12800 random access opportunities during 1 second.

It takes 50 ms for the LTE system to complete one handoff, i.e. from allocating a reserved character code to switching the terminal into a target BS.

The ratio of handoff access in the cell is 37.5%, and the number of the reserved character codes is 24.

There are 3,000 terminals in the cell in the busy state, and 32 random accesses are initiated in one second, wherein 12 thereof are handoff access requests. Suppose the law of random access arrival meets the Poisson distribution: if no character code is reserved, then in the view of the terminals, the collision probability is 0.25% in case of all the terminals do random access, including the handoff terminals. If 24 character codes are reserved, there are 20 random access requests in one second which share 40 character codes, and the collision probability is still 0.25%; while 12 handoff access requests can use the 24 reserved character codes, so collision will not occur, that is, the collision probability is 0%.

The Second Embodiment

In this embodiment, there are 2 random access sub-channels in Cell 1 of a target BS, and there are 64 character codes on each sub-channel, among which, character codes No. 40-63 are reserved for handoff.

Figure 6:
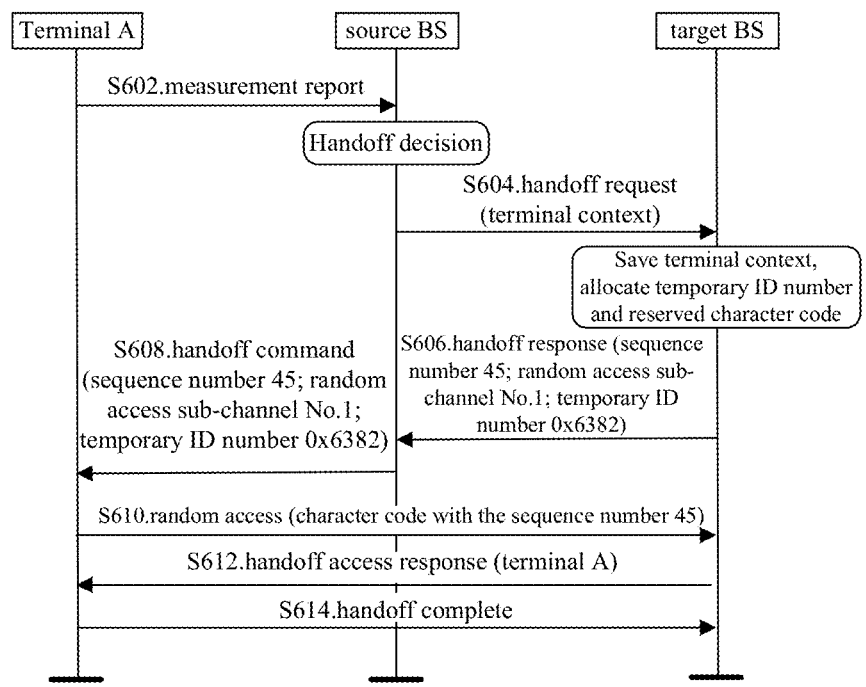
FIG. 6 is a flowchart of the handoff procedure of the LTE system using a reserved character code according to one embodiment of the present invention.

As shown in FIG. 6, the handoff procedure of the reserved character code comprises the following steps:

Step 602, based on the measurement control information sent by a BS, the terminal A measures adjacent cells and sends the measurement result to the serving BS, i.e. the source BS, via the measurement report.

Step 604, the source BS determines to switch the terminal A to Cell 1 of a target BS, and sends a handoff request message to the target BS, and the terminal context information of the source BS is contained in the message;

Step 606, the target BS allocates a 16-bit temporary ID number with a value of ox6382, and a reserved character code with a sequence number of 45 of the first random access sub-channel of Cell 1 to the terminal A, and establishes a one-to-one corresponding relationship between the temporary ID number, the allocated reserved character code and the random access sub-channel that the reserved character code is located in. Thereafter, the target BS sends a handoff response message comprising the temporary ID number of the terminal A, the sequence number 45 of the character code, and the information of the first random access sub-channel;

Step 608, the source BS sends to the terminal A the temporary ID number, the sequence number of the character code, the information of the first random access sub-channel of Cell 1 contained in the handoff response message, and other description information relates to the target BS at a wireless interface via a handoff command;

Step 610, after receiving the handoff command message, the terminal A sends a random access message on the first random access sub-channel of Cell 1 of the target BS, and the character code with a sequence number of 45 is compiled into the message;

Step 612, based on the sequence number of the received character code, the target BS judges that the terminal is processing the handoff access, then based on the sequence number 45 of the character code, and the information of the first random access sub-channel that the character code is located in, the terminal can be corresponded to the terminal A with a temporary ID number of ox6382. Then the target BS sends a handoff access response message to the terminal A on a logical dedicated channel, and there are synchronous information and uplink channel resource information contained in the message, etc. HARQ technology can be employed to improve the reliability of information transmission; and Step 614, after receiving the handoff access response information, the terminal A sends a handoff complete message.

It is apparent that the present invention can realize the following technological effects from the above description:

The method according to the present invention can prevent the terminal requesting handoff access at any time at a wireless interface from initiating a same handoff access message in a same time slot of a same random access sub-channel in the case of being allocated with a character code, and thus possible collisions among handoff access messages can be eliminated, and also the uncertainty that arises when the handoff access message confirms the identity of the terminal at the wireless access network side can be avoided.

Obviously, one skilled in the art shall understand that various modules and steps above can be realized with general computing devices and can be integrated into one single computing device or distributed within a network consisting of multiple computing devices, and alternatively, the various modules and steps above can be realized with the program codes executable by the computing devices, and thus these program codes can be stored in memory devices so as to be executed by the computing devices, or the various modules and steps above can be formed into individual integrated circuit modules, or a plurality of the modules or steps can be formed into a single integrated circuit module so as to be realized. Therefore, the present invention is not limited to any particular hardware or software combination. It should be understood that alterations of the embodiments are apparent to one skilled in the art and do not depart from the scope and spirit of the present invention.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A handoff access method based on random access channel, for handoff access of a mobile terminal of a cellular mobile communication system, comprising the steps of:

Step a, sending a handoff request message to a target base station (BS) by a source BS, the handoff request message is used to request switching a mobile terminal that the source BS serves to the target BS;

Step b, sending a handoff response message to the source BS by the target BS, then forwarding a handoff command with the content of the handoff response message to the mobile terminal by the source BS, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance;

Step c, after receiving the handoff command message by the mobile terminal, determining the handoff command message includes the sequence number of the reserved character code and then selecting the reserved character code and the random access sub-channel that the reserved character code is located in, by the mobile terminal; and Step d, initiating a handoff access procedure on the random access sub-channel by the target BS and the mobile terminal.

2. The handoff access method according to claim 1, wherein the Step b comprises the following step: containing a temporary ID number allocated to the mobile terminal by the target BS in the handoff command message, wherein there is a one-to-one corresponding relationship between the temporary ID number, the reserved character code and the random access sub-channel that the reserved character code is located in.

3. The handoff access method according to claim 2, wherein the Step c comprises the following step: specifying to send a random access message with the reserved character code on the random access sub-channel by the mobile terminal.

4. The handoff access method according to claim 3, wherein the Step d comprises the following step: determining that the mobile terminal initiates a handoff access based on the reserved character code, determining the temporary ID number based on the reserved character code and the random access sub-channel, and then sending a handoff access response message to the mobile terminal corresponding to the temporary ID number separately, by the target BS.

5. The handoff access method according to claim 4, wherein the handoff access response message is transmitted on a downlink logical dedicated channel, or transmitted on a logical dedicated channel via hybrid automatic repeat request technology.

6. The handoff access method according to claim 4, wherein the Step d comprises the following step: sending a handoff complete message by the mobile terminal after the said handoff access response message is received.

7. A handoff access device based on a random access channel, for the handoff access of a mobile terminal in a cellular mobile communication system, comprising:
a handoff request module, used to make a base station (BS) send a handoff request message to a target BS to request switching a mobile terminal that the source BS serves to the target BS;
a handoff response module, used to make the target BS send a handoff response message to the source BS, and the source BS transmit the content of the handoff response message contained in a handoff command to the mobile terminal, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance;
a sub-channel selection module, used to make the mobile terminal determine that the handoff command message includes the sequence number of the reserved character code and then select the reserved character code and the random access sub-channel that the reserved character code is located in after the handoff command message is received; and
a handoff access module, used to make the target BS and the mobile terminal initiate a handoff access procedure on the random access sub-channel.

8. The handoff access device according to claim 7, wherein the handoff access module is used to make the handoff access response message be transmitted on a downlink logical dedicated channel, or transmitted on a logical dedicated channel via hybrid automatic repeat request technology.

9. The handoff access method according to claim 1, wherein the information of the reserved character code is in the system information, and is broadcasted in the cell.

10. The handoff access method according to claim 9, wherein the system information is broadcasted on the broadcasting channel or on the shared channel.

11. A mobile terminal, comprising:
a receiving unit, configured to receive handoff command message from a source base station (BS), wherein a sequence number of a reserved character code allocated by a target BS to the mobile terminal and a random access sub-channel that the reserved character code is located in are contained in the handoff command message, and the reserved character code is a part of random access character codes reserved for the handoff access mobile terminal in advance;
a determining unit, configured to determine the sequence number of the reserved character code contained in the handoff command message;
a selecting unit, configured to select the reserved character code and the random access sub-channel that the reserved character code is located in; and
an accessing unit, configured to initiate a handoff access procedure on the random access sub-channel with the target BS.

12. The mobile terminal according to claim 11, wherein the handoff command message comprises a temporary ID number allocated to the mobile terminal by the target BS, wherein there is a one-to-one corresponding relationship between the temporary ID number, the reserved character code and the random access sub-channel that the reserved character code is located in.

13. A base station (BS), comprising:
a receiving unit, configured to receive a handoff request message sent by a source BS, wherein the handoff request message is used to request switching a mobile terminal that the source BS serves to the BS;
a sending unit, configured to send a handoff response message to the source BS, wherein a sequence number of a reserved character code allocated by the BS to the mobile terminal and a random access sub-channel that the reserved character code is located in are contained in the handoff response message, and the reserved character code is a part of random access character codes reserved for the handoff access mobile terminal in advance; and
an accessing unit, configured to receive a handoff access of the mobile terminal on the random access sub-channel.

14. The base station according to claim 13, wherein the handoff command message comprises a temporary ID number allocated to the mobile terminal by the BS, wherein there is a one-to-one corresponding relationship between the temporary ID number, the reserved character code and the random access sub-channel that the reserved character code is located in.

15. A base station (BS), comprising:
a requesting unit, configured to send a handoff request message to a target BS, wherein the handoff request message is used to request switching a mobile terminal that the BS serves to the target BS;
a receiving unit, configured to receive a handoff response message sent by the target BS; and
a sending unit, configured to send a handoff command message to the mobile terminal, wherein a sequence number of a reserved character code allocated by the target BS to the mobile terminal and a random access sub-channel that the reserved character code is located in are contained in the handoff command message, and the reserved character code is a part of random access character codes reserved for the handoff access mobile terminal in advance.

16. The base station according to claim 15, wherein the handoff command message comprises a temporary ID number allocated to the mobile terminal by the target BS, wherein there is a one-to-one corresponding relationship between the temporary ID number, the reserved character code and the random access sub-channel that the reserved character code is located in.

* * * * *